(12) United States Patent
Groff et al.

(10) Patent No.: US 9,963,865 B2
(45) Date of Patent: May 8, 2018

(54) WATER INLET FILTER SYSTEM

(71) Applicant: Your Quality Solutions, Inc, Lancaster, PA (US)

(72) Inventors: Dale Groff, Gap, PA (US); Angela Lundberg, Willow Street, PA (US); Juan Carlos Salas, New Holland, PA (US)

(*) Notice: Subject to any disclaimer, the term of this patent is extended or adjusted under 35 U.S.C. 154(b) by 81 days.

(21) Appl. No.: 15/191,813

(22) Filed: Jun. 24, 2016

(65) Prior Publication Data

US 2016/0376782 A1    Dec. 29, 2016

Related U.S. Application Data

(60) Provisional application No. 62/184,058, filed on Jun. 24, 2015.

(51) Int. Cl.
*E03F 5/04* (2006.01)
*C02F 1/00* (2006.01)
*B01D 29/58* (2006.01)
*C02F 103/00* (2006.01)

(52) U.S. Cl.
CPC ............ *E03F 5/0404* (2013.01); *B01D 29/58* (2013.01); *C02F 1/001* (2013.01); *C02F 1/004* (2013.01); *C02F 2103/001* (2013.01); *C02F 2201/002* (2013.01); *C02F 2307/00* (2013.01)

(58) Field of Classification Search
CPC ........ E03F 5/0404; E03F 5/14; B01D 29/118; B01D 29/356; B01D 29/58; C02F 2103/001; C02F 2201/002; C02F 2201/003

USPC .................... 210/163, 164, 170.03, 337, 339
See application file for complete search history.

(56) References Cited

U.S. PATENT DOCUMENTS

| | | | | |
|---|---|---|---|---|
| 5,788,849 A * | 8/1998 | Hutter, Jr. | ............. | E03F 5/0404 210/163 |
| 7,112,274 B1 * | 9/2006 | Sanguinetti | ........... | E03F 5/0404 210/163 |
| 7,132,045 B1 * | 11/2006 | Trangsrud | ............. | E03F 5/0404 210/163 |
| 7,524,414 B1 * | 4/2009 | Barragan | ............... | E03F 5/0404 210/163 |
| 8,051,568 B2 * | 11/2011 | Moody | ................. | E03F 5/0404 210/164 |
| 8,679,329 B2 * | 3/2014 | Vreeland | ............... | E03F 5/0404 210/164 |
| 2006/0201860 A1 * | 9/2006 | Happel | ................. | E03F 5/0404 210/163 |
| 2009/0101553 A1 * | 4/2009 | Lucas | ................... | E03F 5/0404 210/164 |

* cited by examiner

*Primary Examiner* — Christopher Upton
(74) *Attorney, Agent, or Firm* — Steve O'Donnell

(57) ABSTRACT

A storm water inlet filter system is disclosed which comprises at least two, but preferably three, distinct filter layers. The storm water inlet filter system uses a nested basket structure in which one filter basket fits within another. Preferably a piece of disposable filter media is placed within the internal basket. Polluted water flows first into the inner basket, and onto the disposable filter media. Overflowing water passes into the outermost basket which can remove debris. The storm water inlet filter system can be used with many existing drainage systems, and can be cleaned and the disposable filter media replaced without the use of specialized equipment or training.

4 Claims, 5 Drawing Sheets

WATER INLET FILTER SYSTEM

FIELD OF THE INVENTION

The subject matter of this application pertains to storm water inlets. More specifically, it pertains to storm water inlet filter systems that can capture and remove debris and pollutants from water at it flows into the drain.

BACKGROUND

Most streets, parking, lots, and just about any other paved surface comprise storm water drains so that liquids, mostly water from rain or melting snow, will drain away instead of accumulating on the surface. Often these surfaces have a slight grade to guide water to the drains.

Of course, water is not the only thing flushed towards the drain. The flowing water washes all types of refuse towards the drain. Leaves, plastic bags, disposable cups, soda cans, and twigs, are all common litter that could flow into a drain, collect in the drain or further down the sewer, and cause a blockage. Often this risk is mitigated by a storm drain grate which covers the drain and blocks the largest refuse from entering the drain.

A simple storm drain grate is, however, largely ineffective at removing smaller materials and wholly ineffective at removing chemical, biological, or petroleum contaminants. Storm water inlet filters are known in the art, but the added maintenance requirements and often prohibitive costs have impeded acceptance.

SUMMARY

The subject matter of this application pertains to storm water inlet filter systems. In particular, it discloses a nested-basket storm water inlet filter system in which liquids must pass through two porous baskets before entering the sewer. Most preferred embodiments further comprise a third filter which can prevent the passage of smaller particulates and, in most highly preferred embodiments, remove chemical and petroleum contaminants from the water.

One objective of the subject matter of this application is to provide a new filter system that can prevent debris from entering the sewer. A further objective of the subject matter of this application is to provide a new filter system which can prevent particulates from entering the sewer. Yet another objective is to provide a storm water inlet filter system capable of preventing chemical and petroleum pollutants from passing through to the sewer. Further, a primary objective of the subject matter of this application is to provide a storm water inlet filter system which is easily maintained and which doesn't require specialized equipment or skill to install and maintain and which can be readily adapted for different chemical, biological, or petroleum challenges.

The subject matter of this application meets these objectives.

The storm water inlet filter system is comprised of two nested porous baskets, separated by a slight gap. Most preferred embodiments also comprise a disposable filter pad or sachet with filtering properties.

The first porous basket comprises a lip or flange which rests atop an inlet or manhole frame when a user places the basket in the drain. The second basket fits inside of the first basket. Each of the baskets has an opening in their tops so water can enter and pass through while debris is captured. A grate may be placed over the storm water inlet filter system to prevent larger debris from filling the second basket. The dimensions of the second basket are such that it fits within the first basket but that there is a space between the sides of the second basket and the first basket which could allow water and pollutants to bypass the second basket. To prevent this, the first basket further comprises an inwardly projecting lip or flange which covers any gap between the sides of the first basket and the second basket so water and debris if forced to flow into the second basket. This space between the baskets' walls is, however, a desired feature of the storm water inlet filter system because if the second basket becomes clogged or filled with debris then water continuing to spill into the second basket will overflow into this space between the baskets and pass through the first basket and down the drain.

The first basket preferably also comprises one or more rails upon which the second basket lies, thereby separating the bottom of the second basket from the bottom of the first basket by a gap. This gap serves much the same purpose as the space between the baskets' walls as it allows overflow from the second basket to flow through the first basket and into the sewer.

Each basket is porous, but the pores of one basket preferably do not align with the pores of the other basket. In this way, debris which might pass through a pore in the second basket may be blocked by the first basket.

Most preferred embodiments further comprise a replaceable filter media. This media may be a sheet of material, a sachet of filter material, or other form as necessary for the application. Preferably, the replaceable filter media can capture chemical, biological, and petroleum pollutants in addition to particulates.

BRIEF DESCRIPTION

BRIEF DESCRIPTION

The following description and drawings referenced in it illustrate embodiments of the application's subject matter. They are not intended to limit the scope. Those familiar with the art will recognize that other embodiments of the disclosed method are possible. One should consider all such alternative embodiments as within the application's disclosure.

Each reference number consists of three digits. The first digit corresponds to the figure number in which that reference number is first shown. Reference numbers are not necessarily discussed in the order of their appearance in the figures.

The subject matter of this application pertains to a storm water inlet filter system comprising an outer basket and an inner basket. In the most preferred embodiment the storm water inlet filter system further comprises a replaceable filter medium which can capture finer particulates and which may also capture chemical, biological, and petroleum pollutants As used in this application, the noun "filter" refers to the disclosed baskets, separately or together, as the context of the sentence indicates. "Filter media" means disposable or reusable sachets or pieces of material which can capture materials such as particulates, chemical, biological, and petroleum pollutants. Two exemplary filter media are SKAPS GT-160 manufactured by SKAPS Industries of Athens, Ga. and Ultra-X-Tex manufactured by ULTRATECH International, Inc. of Jacksonville, Fla., although the exact filter chosen for any application will depend on the anticipated pollutants, availability, cost, and other factors. A "filter system" is the combination of the two disclosed baskets with, or without filter media. The verb "filter" means to remove pollutants from water flowing through a porous screen or grate, the disclosed basket or baskets, or filter media.

The subject matter of this application is described as an outside water filter system capping a drain through which water flows into a sewer before being discarded into the water shed or aquifer, but this should not limit the scope of the claims. The subject matter of this application may be used in nearly any situation where solids and dissolved compounds need to be separated from liquids. For example, the subject matter of this application could be useful in the context of a pool drain, car wash drain, oil reclamation unit, and even the drain on the floor of a meat processing plant.

These word choices are for the sake of simplicity and should not be determined to narrow the scope of the claims and should be given their widest possible meaning in the light of the disclosure.

Figure 1:
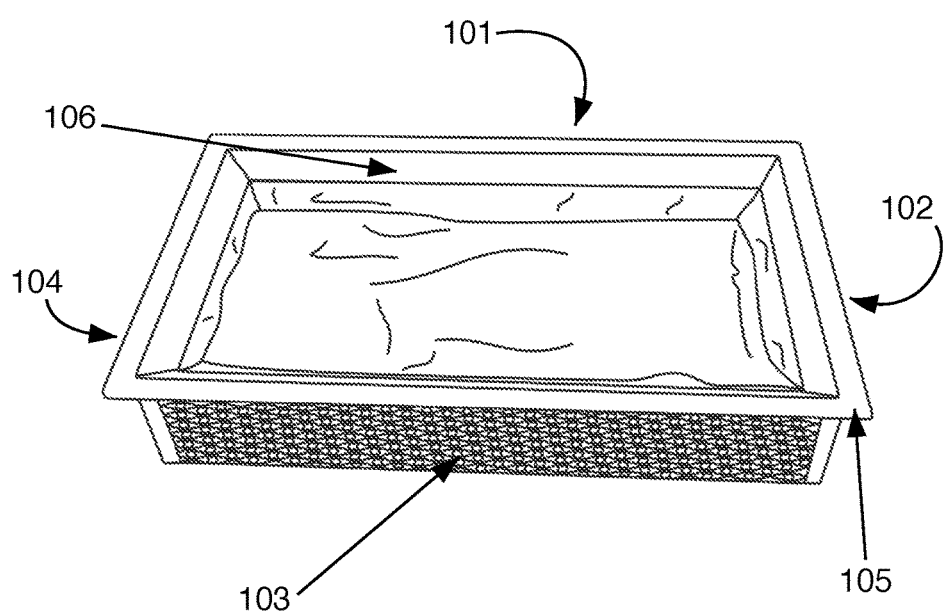
FIG. 1 is an illustration of the disclosed storm water inlet filter system.
Figure 2:
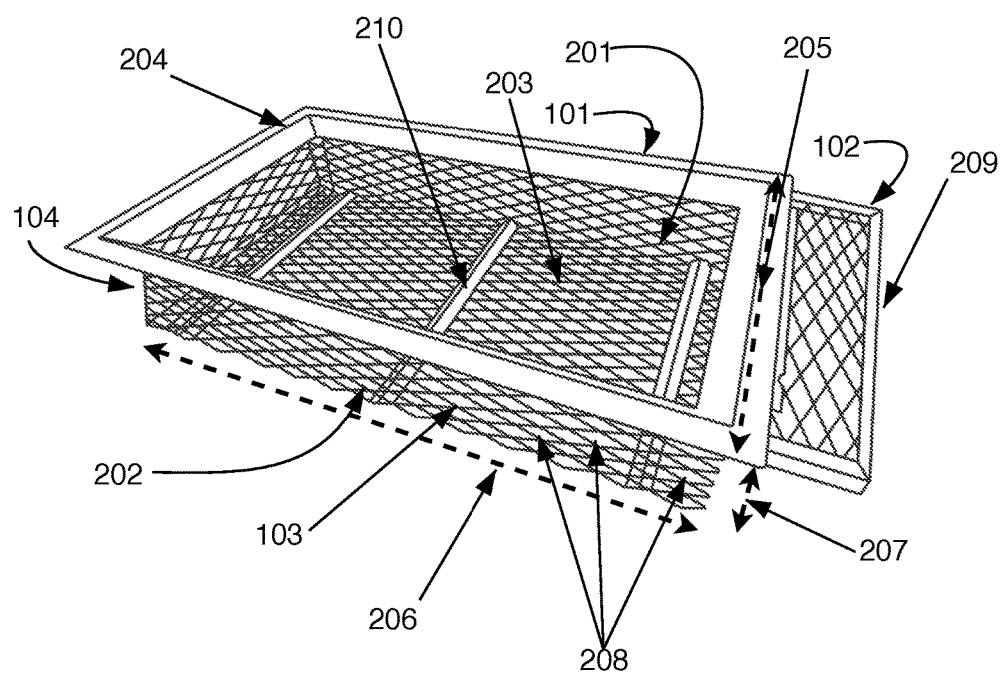
FIG. 2 is an illustration of the storm water inlet filter system's larger, outer basket.
Figure 3:
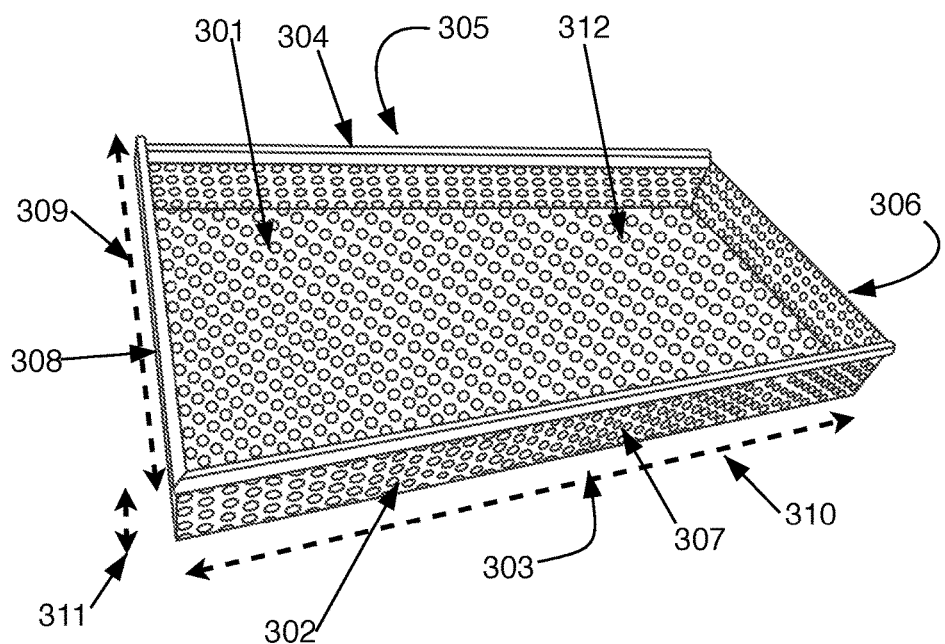
FIG. 3 is an illustration of the storm water inlet filter system's smaller, inner basket.
Figure 4:
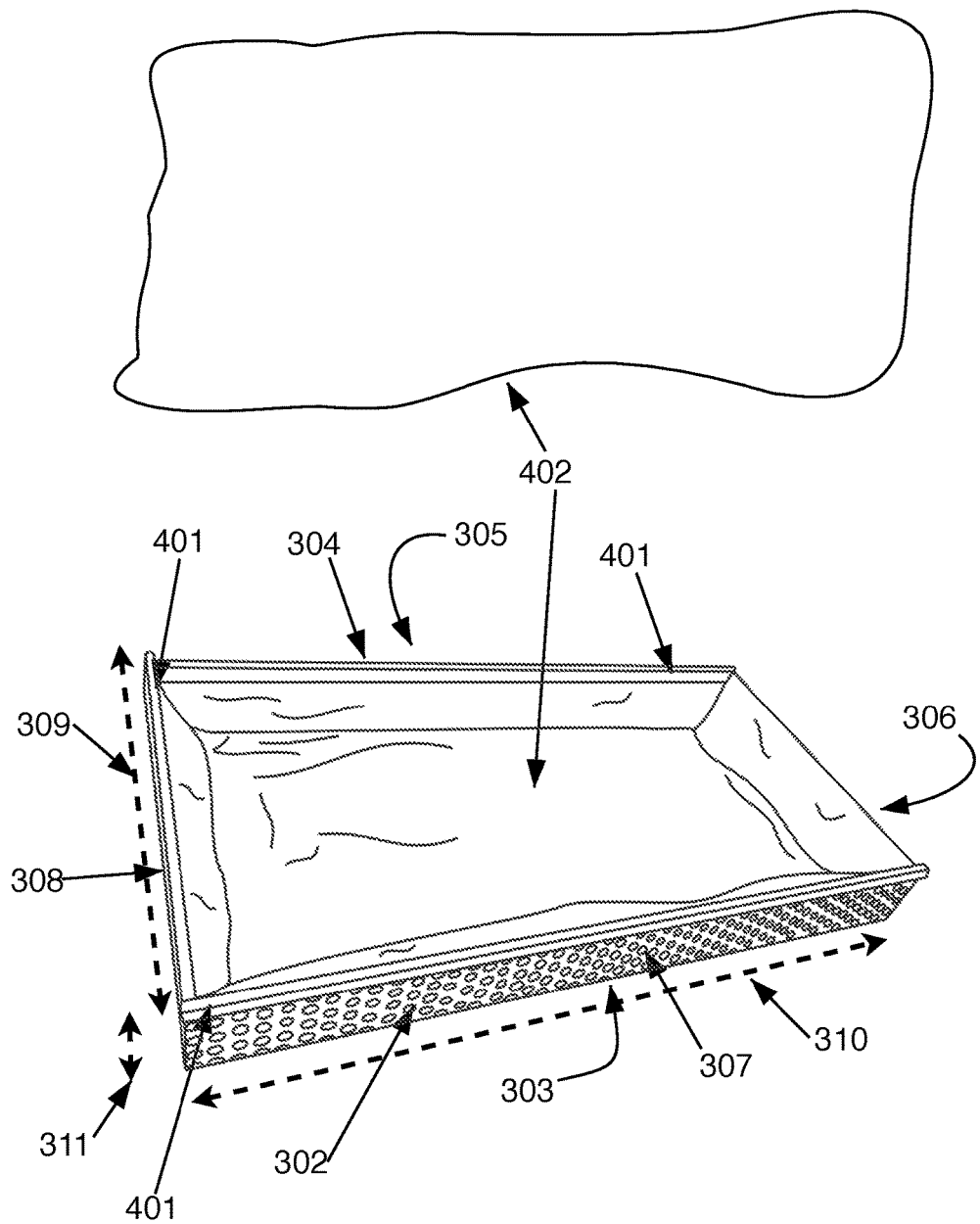
FIG. 4 is an illustration of the storm water inlet filter system's smaller, inner basket with a replaceable filter media. The replaceable media is shown above the basket and inside the basket.
Figure 5:
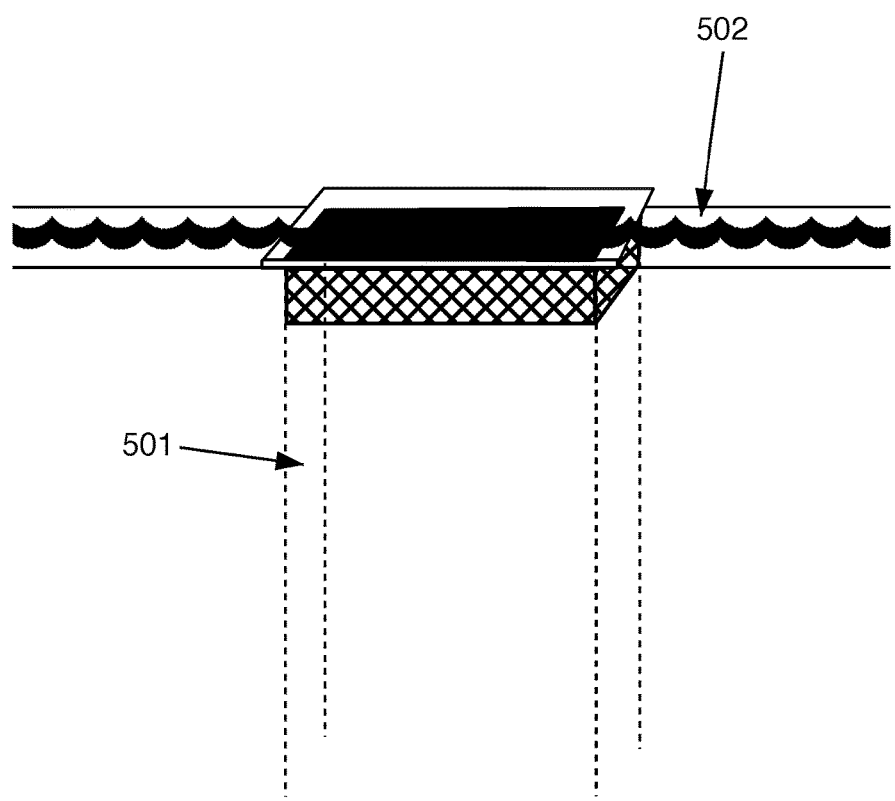
FIG. 5 is an illustration of the disclosed storm water inlet filter system supported on an inlet top.

The storm water inlet filter system (FIG. 1) comprises a first basket (FIG. 2) and a second basket (FIGS. 3 and 4).

The first basket comprises an inside (201), an outside (202), a bottom (203), a top (204), a first wall (101), a second wall (102), a third wall (103), a fourth wall (104), a depth (205), and width (206), and a height (207). The first basket's top comprises an outer flange (105) predominantly parallel to the basket's bottom and extending outward from the basket. The first basket's top further comprises an inner flange (106), extending toward the center of the basket and slanted toward the first basket's bottom. The first basket is made of a material, preferably a rust-proof metal, having a plurality of channels (208) allowing water to flow through the basket. The first basket further comprises an access means (209) through which a user may insert the second basket. In a most preferred embodiment, the access means is a door made of one of the first basket's walls and a hinge connecting this wall to the top of the basket such that the wall may be tilted up. In preferred embodiments, the first basket's inside bottom further comprises at least one internal basket support (210) upon which the second basket rests when inserted into the first basket.

The second basket comprises an inside (301), an outside (302), a bottom (303), a top (304), a first wall (305), a second wall (306), a third wall (307), a fourth wall (308), a depth (309), and width (310), and a height (311). The second basket is made of a material, preferably a rust-proof metal, having a plurality of channels (312) allowing water to flow through the basket. The second basket's width, depth, and height are less than the first basket's width, depth, and height, respectively, so that the second basket can be inserted into the first basket through the first basket's access means. The second basket's width and depth are such that the walls of the second basket are covered by the first basket's inner flange. In preferred embodiments, the second basket further comprises at least two retention means (401) which secure a unit of replaceable filter media (402) to the inside of the second basket. In the most preferred embodiment, the retention means are clips which reversibly secure the edges of replaceable filter media to the highest point of the second basket's walls.

In its most preferred use, a user would place a unit of filter media into the inside of the second basket and secure the filter media to the basket with the retention means. The user would open the first basket's access means and slide the second basket inside so that the second basket rests on the internal basket support or supports. The combined storm water inlet filter system is then placed onto the inlet top. The dimensions of the storm water inlet filter system are such that the first basket fits within the inlet top, as the outer flange rests on the top edge of the inlet top (501), and perhaps also on the surrounding pavement. A grate may be placed over the storm water inlet filter system as required. Polluted water flows toward the drain and through the grate (if present). The water (502) flows over the outer flange and the inner flange and into the second basket. The water passes through the replaceable filter media, through the second basket's channels into the first basket, and then through the first basket's channels into the drain. Although ideally, all water entering the storm water inlet filter system passes though the replaceable filter media, it is possible for the filter media to become blocked. In case of a such a blockage, instead of the water pooling above the storm water inlet filter system it can flow over the sides of the second basket into the first basket and then though the first basket's channels. Although the first basket cannot filter contaminated water as thoroughly as the second basket with replaceable filter media, it is still capable of removing physical contaminates larger than its channels. A user would periodically check the installed storm water inlet filter system and replace the filter media as necessary by removing the grate (if present) and lifting the storm water inlet filter system. Once removed, the user opens the first basket's access means and removes the second basket. The second basket's retention means are removed and the old filter media is replaced with new filter media. The storm water inlet filter system its them reassembled and replaced on the inlet top.

We claim:

1. A storm water inlet filter system comprising a first basket and a second basket, in which:
    the first basket comprises a width, a depth, a height, a first wall, a second wall, a third wall, a fourth wall, a bottom, a top outer flange having a width, a top inner flange having a width, and an access means connected to one of the first basket's walls such that this wall can be displaced and the second basket inserted into the interior of the first basket and
    the second basket comprises a width less than the first basket's width but greater than the first basket's width minus the width of the top inner flange, a depth less than the first basket's depth but greater than the first basket's depth minus the width of the top inner flange, a height less than the first basket's height, a first wall, a second wall, a third wall, a fourth wall, and a bottom.

2. The storm water inlet filter system of claim 1 in which the walls and bottom of the first basket and the bottom of the second basket are water-permeable.

3. The storm water inlet filter system of claim 1 in which the walls and bottom of the first basket and the bottom and at least one wall of the second basket are water-permeable.

4. The storm water inlet filter system of claim 1 in which the walls and bottom of the first basket, and the bottom and walls of the second basket are water-permeable.

\* \* \* \* \*